United States Patent [19]

Patsch et al.

[11] Patent Number: 4,925,954

[45] Date of Patent: May 15, 1990

[54] VAT DYE BASED ON FLOURANTHENE

[75] Inventors: Manfred Patsch, Wachenheim; Gerhard Epple, Weisenheim; Helmut Flohr, Mainz; Helmut Degen, Frankenthal; Uwe Nahr, Mutterstadt, all of Fed. Rep. of Germany

[73] Assignee: BASF Aktiengesellschaft, Ludwigshafen, Fed. Rep. of Germany

[21] Appl. No.: 275,601

[22] Filed: Nov. 23, 1988

Related U.S. Application Data

[63] Continuation of Ser. No. 913,377, Sep. 30, 1986, abandoned.

[30] Foreign Application Priority Data

Oct. 11, 1985 [DE] Fed. Rep. of Germany ....... 3536259

[51] Int. Cl.$^5$ ............................................. C07D 209/56
[52] U.S. Cl. .................................................. 548/417
[58] Field of Search ................. 260/368, 694; 548/417

[56] References Cited

U.S. PATENT DOCUMENTS

| | | | |
|---|---|---|---|
| 2,219,707 | 10/1940 | Kern | 260/368 |
| 2,253,789 | 8/1941 | Kern | 260/368 |
| 2,297,779 | 10/1942 | Kern | 548/417 |
| 2,862,930 | 12/1958 | Caliezi | 260/694 |

FOREIGN PATENT DOCUMENTS 3209426 10/1982 Fed. Rep. of Germany .
3325277 1/1984 Fed. Rep. of Germany .

OTHER PUBLICATIONS

Helmut et al., "Anthrimides", Chem. Abs., vol. 100 (16), entry 122769m (1984).

*Primary Examiner*—Anton H. Sutto
*Assistant Examiner*—Andrew G. Rozycki
*Attorney, Agent, or Firm*—Oblon, Spivak, McClelland, Maier & Neustadt

[57] ABSTRACT

A vat dye based on monobromofluoranthene is prepared by a process in which monobromofluoranthene which contains no more than 7% of dibromofluoranthene is reacted with 1-amino-4-benzoylaminoanthraquinone, the reaction product is condensed at from 50° to 70° C. in 83–88% strength sulfuric acid to give the carbazole compound, and the latter is then further brominated to a bromine content of from 20 to 23% by weight.

The dyes obtained by the novel process are very useful for dyeing cotton.

2 Claims, No Drawings

VAT DYE BASED ON FLOURANTHENE

This application is a continuation of application Ser. No. 06/913,377, filed on Sept. 30, 1986, now abandoned.

The present invention relates to a process for the preparation of a vat dye based on monobromofluoranthene, wherein monobromofluoranthene which contains no more than 7% of dibromofluoranthene is reacted with 1-amino-4-benzoylaminoanthraquinone in a molar ratio of 1:1, the reaction product is condensed at from 50° to 70° C. in 83–88% strength by weight sulfuric acid to give the carbazole compound, and the latter is then brominated to a bromine content of 20–23% by weight.

U.S. Pat. No. 2,219,707, Example 2, discloses that treating an anthrimide of bromofluoranthene and 1-amino-4-benzoylaminoanthraquinone with concentrated sulfuric acid gives a vat dye which dyes cotton in a yellowish olive hue. In comparison, the dye obtained by the process according to the invention dyes cellulosic material in clear yellowish olive hues and has substantial advantages in respect of fastness to soda boiling and fastness to hypochlorite.

The novel dye is prepared from fluoranthene in a 4-stage synthesis, stages 1 and 2 and stages 3 and 4 expediently being summarized as follows:
1. bromination of fluoranthene,
2. anthrimide formation by reaction of bromofluoranthene with 1-amino-4-benzoylaminoanthraquinone,
3. conversion to the carbazole in sulfuric acid and
4. bromination of the carbazole compound.

The bromination of fluoranthene to give monobromofluoranthene which contains no more than 7% of the dibromo derivative is advantageously carried out in from 7 to 20 times the amount of nitrobenzene at from 0° to 30° C., preferably from 15° to 25° C. The brominating agent used is elemental bromine in the form of a 20–27% strength solution in nitrobenzene or an aqueous sodium bromide/sodium bromate solution. Where bromine is used, the bromine solution is added dropwise to the fluoranthene solution in the course of from 4 to 10 hours. If, on the other hand, halogenation is carried out using a bromide/bromate solution, the aqueous salt solution is added all at once. Thereafter, the theoretically required amount of acid, in the form of sulfuric acid of about 20% strength, is added dropwise in the course of from 4 to 10 hours. From 0.95 to 1.25 moles of bromine or from 0.62 to 0.83 mole of sodium bromide and from 0.30 to 0.42 mole of sodium bromate are employed per mole of fluoranthene. The reaction product is preferably used for the preparation of the anthrimides without isolation, the anthrimides being obtained in a conventional manner by reacting the bromofluoranthene with 1-amino-4-benzoylaminoanthraquinone.

According to the invention, the anthrimide is converted to the carbazole by a procedure in which the dried product is introduced at from 20° to 25° C. and while stirring, into from 10 to 25, preferably 20, times the amount of an 83–88, preferably 84–86, % strength sulfuric acid, and the mixture is heated to about 60° C. and stirred at this temperature for from 2 to 4 hours.

For further bromination of the carbazole compound, the melt from the reaction is cooled again to 20°–25° C., and bromine is added in the course of 2 hours in an amount such that the dye contains from 20 to 23% by weight of bromine. When the addition of bromine is complete, stirring is continued for from 6 to 20, preferably from 12 to 14, hours. To isolate the product, the reaction mixture is poured onto water, and the precipitated dye is filtered off under suction and washed with water.

The Examples which follow illustrate the invention.

EXAMPLE 1

(a) Preparation of the anthrimide 160 g (0.75 mole) of 95% pure fluoranthene are added to 1200 g of nitrobenzene. 300 g of water are added, after which 56 g (0.54 mole) of sodium bromide and 41 g (0.27 mole) of sodium bromate are introduced in succession and the mixture is stirred for 0.5 hour at from 20° to 25° C. 156 ml of 22.5% strength sulfuric acid are continuously added dropwise to the thoroughly stirred mixture at from 20° to 22° C. in the course of from 7 to 8 hours, while cooling. When the dropwise addition is complete, stirring is continued for 12 hours and the reaction mixture is analyzed by gas chromatography. It is found to be composed of 9.7% of fluoranthene, 84% of monobromofluoranthene and 5.5% of dibromofluoranthene (percentages by area). The aqueous phase is separated off, after which 150 g of calcined soda, 230 g (0.67 mole) of 1-amino-4-benzoylaminoanthraquinone (calculated as 100%) and 5 g of copper oxide are added to the nitrobenzene phase. The reaction mixture is heated at from 190° to 200° C. until the thin layer chromatogram of the sample shows that only traces of 1-amio-4-benzoylaminoanthraquinone are still present; this takes from 7 to 8 hours. The solvent is evaporated off under reduced pressure, 300 g of water and 0.5 g of a commercial wetting agent are added to the residue, the mixture is stirred for 2 hours at 80° C. and the precipitated product is filtered off under suction, washed salt-free and neutral with warm water and dried. 390 g of anthrimide are obtained.

(b) Preparation of the dye 1.56 kg of water and 13.45 kg of 96% strength sulfuric acid are initially taken in a 20 l enamel kettle, and 1.50 kg of anthrimide [see (a)] are introduced a little at a time into the stirred mixture at from 20° to 25° C. in the course of from 2 to 3 hours. The mixture is heated to 60° C. in the course of 0.5 hour and stirred at from 60° to 65° C. for 2.5 hours. The reaction mixture is cooled to room temperature, after which 0.97 kg of bromine is added dropwise at from 20° to 25° C. in the course of 2 hours. Stirring is continued for 14 hours at this temperature, after which the reaction mixture is added to a mixture of 22 kg of water, 14 kg of ice and 0.04 kg of sodium sulfite. Stirring is continued for 1 hour at from 20° to 25° C., and the precipitated product is filtered off under suction and washed neutral with hot water. The yield of dry dye is 1.90 kg. The dye dyes cellulosic material from the vat in a clear yellowish olive hue.

EXAMPLE 2

213 g (1 mole) of 95% pure fluoranthene are dissolved in 3800 g of nitrobenzene, and 180 g (1.12 mole) of bromine in 600 g of nitrobenzene are added to the stirred solution at from 10° to 15° C. in the course of 5 hours. When the dropwise addition is complete, stirring is continued for 12 hours and the reaction mixture is analyzed by gas chromatography. It is found to have the following composition: 5.3% of fluoranthene, 87.1% of monobromofluoranthene and 6.5% of dibromofluoranthene (percentages by area). When the reaction is complete, the hydrogen bromide formed during the bromination is expelled with nitrogen, and 200 g of calcined soda, 306 g (0.89 mole) of 1-amino-4-benzoylaminoanthraquinone (calculated as 100%) and 7 g of copper oxide are added to the reaction solution. The further reaction to give the dye is carried out by a method similar to that described in Example 1. The tinctorial properties of the dye obtained are identical to those of the dye described in Example 1.

We claim:

1. A vat dye based on a condensate of monobromofluoranthene which contains not more than 7% dibromofluoranthene which is prepared by the process comprising:

reacting monobromofluoranthene containing no more than 7% by weight dibromofluoranthene with 1-amino-4-benzoylaminoanthraquinone in a 1:1 molar ratio;

condensing the reaction product of the first step at from 50°–70° C. in 83–88% strength by weight sulfuric acid to yield the carbazole compound; and brominating the carbazole compound obtained to a bromine content of 20–23% by weight.

2. The vat dye of claim 1, wherein the reaction product of the first step is condensed at 60° C. in an 84–86% strength by weight sulfuric acid medium to give the carbazole compound.

* * * * *